United States Patent [19]

Chazelas et al.

[11] Patent Number: 5,381,005
[45] Date of Patent: Jan. 10, 1995

[54] OPTICAL FIBER STRESS DETECTOR USING AMPLITUDE MODULATION

[75] Inventors: Jean Chazelas, Paris; Marc Turpin, Bures sur Yvette, both of France

[73] Assignee: Thomson-CSF, Puteaux, France

[21] Appl. No.: 42,020

[22] Filed: Apr. 2, 1993

[30] Foreign Application Priority Data

Apr. 2, 1992 [FR] France .................. 92 04000

[51] Int. Cl.⁶ ............................. H01J 5/16
[52] U.S. Cl. ................. 250/227.19; 250/231.19; 73/800
[58] Field of Search ........... 250/227.19, 227.13, 250/231.19; 73/657, 800; 385/819

[56] References Cited

U.S. PATENT DOCUMENTS

| | | | |
|---|---|---|---|
| 4,255,017 | 3/1981 | Hasegawa . | |
| 4,529,876 | 7/1985 | Walker | 250/227.19 |
| 4,652,129 | 3/1987 | Martinelli | 356/345 |
| 4,859,843 | 8/1989 | Baney et al. | 250/227.23 |
| 4,881,813 | 11/1989 | Koo et al. | 356/345 |
| 4,929,050 | 5/1990 | Wilson | 250/227.19 |
| 5,009,505 | 4/1991 | Malvern | 250/227.19 |

FOREIGN PATENT DOCUMENTS

| | | |
|---|---|---|
| 326309 | 8/1989 | European Pat. Off. . |
| 0381309 | 8/1990 | European Pat. Off. . |
| 0404242 | 12/1990 | European Pat. Off. . |
| 0434504 | 6/1991 | European Pat. Off. . |
| 3638583 | 6/1987 | Germany . |
| 8303684 | 10/1983 | WIPO ............... 250/227.19 |

OTHER PUBLICATIONS

Optics Communications, vol. 85, No. 5/6, Oct. 1, 1991, pp. 385–388, Pie-Yau Chien, et al., "An Optical Signal Generator Based on a Triangularly Phase-Modulated Interferometer".

Hernday, et al., Hewlett-Packard Journal, vol. 42, No. 1, Feb. 1991, pp. 13–22. "Design of 20-GHz Lightwave Component Analyzer".

Wong, et al., Hewlett—Packard Journal, vol. 42, No. 1, Feb. 1991, pp. 6–13. "High-Speed Lightwave Component Analysis to 20 GHz".

Measures, No. 611, Oct. 1989, pp. 37–38. "Photonetics: Le Multiplexage Temporel Pour Des Detecteurs T.O.R.".

Vifian, IEEE Instrumentation and Measurement Technology Conference, vol. 90CH, No. 2735, Feb. 1990, pp. 334–338. "Optical Measurements based on RF Modulation Techniques".

Patent Abstracts of Japan, vol. 5, No. 110, Jul. 1981. JP 56-51636.

Primary Examiner—David C. Nelms
Assistant Examiner—Stephone B. Allen
Attorney, Agent, or Firm—Oblon, Spivak, McClelland, Maier, & Neustadt

[57] ABSTRACT

An optical fiber stress detector in which the light beam transmitted in the optical fiber which has to detect stresses is modulated in amplitude by a microwave alternating signal. The signal coming from the fiber is demodulated and then transmitted to a detector which measures the phase-shift existing between the demodulated signal and a signal derived from the modulation alternating signal. Application to the detection of stresses in any composite structures such as public constructive works, aircraft wings etc.

9 Claims, 4 Drawing Sheets

OPTICAL FIBER STRESS DETECTOR USING AMPLITUDE MODULATION

BACKGROUND OF THE INVENTION

1. Field of the Invention

The invention relates to an optical fiber stress sensor and notably to a device enabling the detection of the stresses applied to an optical fiber. These stresses may be elongation stresses or compression stresses along the axis of the fiber, forces of pressure (shocks) applied perpendicularly to the axis of the fiber, strains (bending) and temperature variations that cause variations of the refraction index of the fiber.

This invention can be applied to the inspection of damage to structures, and especially to composite structures, by non-destructive techniques. It can be applied, for example, to the checking of constructive works (such as bridges and dams) and to the checking of strains undergone by aircraft frames.

The checking of damage to composite structures can be done by the insertion of optical fiber sensors. This method is described in the French patent application No. 91 15347. This method is especially well suited to the tracking of strains or to the detection of delamination under fatigue.

Damage to structures can be checked by the attachment by bonding, to the structure to be checked, of an assembly constituted by a rigid element and an optical fiber as described in the French patent application No. 92 03006.

All these systems have, in common, a method of measurement using a Michelson type interferometer.

The invention makes it possible to do away with the need for this optical interferometry by transferring the detection to the microwave field.

2. Description of the Prior Art

Among the many methods of measurement designed for the characterization of networks of optical fibers, two main categories may be distinguished:
reflectometry;
interfero-polarimetry.

Reflectometrical methods comprise methods of meaurement related to optical or microwave reflectometry in the time domain or the frequency domain. The best known of these methods are:
Optical Time Domain Reflectometry (OTDR)
Optical Frequency Domain Reflectometry (OFDR) and its derivatives, especially frequency gradient (FM-CW) type techniques.

Reflectometry is based on the principle of radar. A light pulse is injected into the optical fiber. The reflected light (i.e. the light backscattered from a defect of the fiber or a connector or a fold) is measured by means of a detector. The localization of the defects is obtained by measuring the time difference between the instant $T_0$ at which the signal is sent and the instant $T_1$ of return of the signal after reflection from the defect.

The main advantage of the OTDR lies in its relative simplicity and in its operation on every type of fiber.

The main drawbacks of this method are:
the degree of sensitivity in the detection of defects;
spatial resolution: indeed, OTDR remains simple so long as the spatial resolution required is not too great, i.e. so long as the minimum distance between two defects is not too small. If this distance is too small, then it is necessary to have available laser sources that are pulsed at high speeds (of the order of one picosecond for a resolution value, along the fiber, of the order of one centimeter).

Optical frequency domain reflectometry (OFDR) uses a technique very close to that of methods used for the analysis of networks in microwave mode.

In this technique, the optical carrier is frequency modulated. Then, the modulation of the carrier is made to vary by frequency hopping in a range of frequencies that is as wide as possible. The optical response of the system being tested is measured by heterodyne detection giving the amplitude and the phase for each frequency. The response in the time domain is obtained after Reverse Fourier Transform.

When the system works in microwave mode, with a wide passband (of several GHz), the spatial resolution obtained is great (values of the order of one mm. have been reported in publications).

The degree of spatial resolution is the main advantage of this technique.

The field of the frequency ramp or gradient technique comprises the applications of radar techniques to OFDR. In these techniques, the laser source is frequency modulated. A frequency ramp or gradient applied to the laser source enables the localizing of the defects of an optical fiber by measuring the delay between the transmission and the echo reeived by backscattering.

These techniques benefit from high spatial resolution, but require complex methods for the frequency modulation of the laser source (especially in the case of semiconductor lasers).

The interfero-polarimetrical methods are based on Michelson type optical interferometry.

This method is described especially in the patent application No. 88 00780.

The main advantage of this method comes from the sensitivity of the fiber, which is a fiber with hollowed structure, as a pressure or strain sensor, and from the use of interferometry.

The main drawbacks are:
the spatial resolution is presently limited to about ten centimeters;
the difficulty of implementing this method in a harsh environment.

SUMMARY OF THE INVENTION

An object of the invention is a detector that is based on a different technique, and is based notably on measurements of microwave phase-shifts.

The invention therefore relates to a optical fiber stress detector comprising at least one optical fiber and one optical source sending out a light beam in the optical fiber, said detector comprising:

a device for the amplitude modulation of the light beam controlled by at least one modulation frequency electrical signal;

a detection device connected to the fiber converting the modulated light beam, after it has passed through at least one zone of the fiber, into a measurement electrical signal and measuring the phase-shift existing between this measurement electrical signal and the modulation frequency electrical signal or a signal derived from this electrical signal.

BRIEF DESCRIPTION OF THE DRAWINGS

The different objects and features of the invention will appear more clearly from the following description and from the appended figures, of which.

MORE DETAILED DESCRIPTION

Figure 1A:
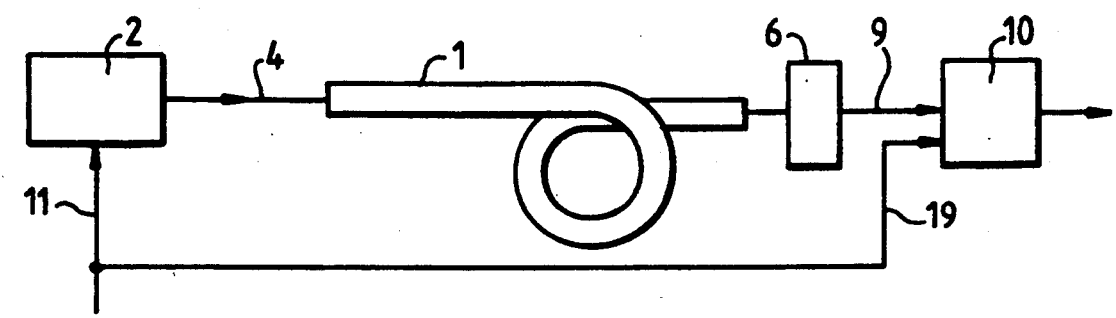
FIGS. 1a to 1c show a simplified view of an exemplary embodiment of the device of the invention.

The device of FIG. 1a comprises a fiber 1 that receives a light beam 4 from an optical source 2.

Figure 1B:
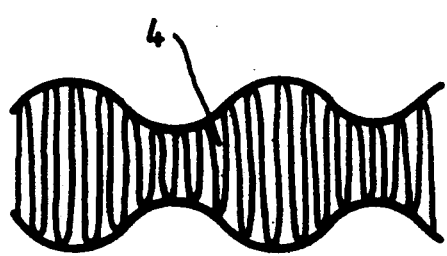
Figure 1C:
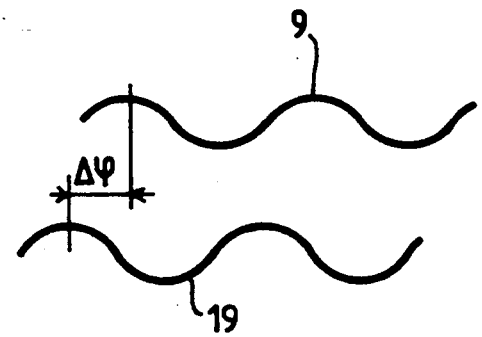

Under the control of an alternating electrical signal 11, the light beam 4 is modulated in amplitude. The light beam 4 is of the type shown in FIG. 1b. The light beam 4 is transmitted by the fiber 1 to a demodulation device 6 which gives a demodulated signal such as the signal 9 of FIG. 1c.

This signal 9 is transmitted to a phase-shift measuring device 10. This device 10 also receives a signal 19 that is derived from the electrical modulation signal 11 and measures the phase shift between the signals 9 and 19.

The signal 19 may be derived directly from the signal 11, and may be simply subjected to a delay (by a device not shown) corresponding to the time taken for the transmission of the beam 4 and of the signal 9. When there is no disturbance in the fiber 1, the signals 9 and 19 are normally in phase or in a determined and known phase relationship. When the fiber 1 undergoes a disturbance, the time taken for the transmission of the light beam 4 varies, the signals 9 and 19 undergo a phase-shift variation ($\Delta\phi$ in FIG. 1c) and the device 10 measures this phase shift.

The modulation frequency (the frequency of the signal 11) may, depending on the use of the device, have a value ranging, for example, from 1 GHz to several tens of GHz.

In this system, the source 2 may be, for example, a laser diode that is modulated in amplitude by a microwave signal, the frequency of which will be chosen as a function of the desired spatial resolution and of the phase precision that can be achieved by the microwave measurements.

This microwave signal on an optical carrier is injected into the optical fiber which may be a monomode fiber or a polarization-maintaining fiber and which plays the role of an intrinsic sensor.

The application of a stress or of a strain on the optical fiber creates a variation in the refraction index of the medium expressed by a phase shift or a delay of the measurement signal with respect to the reference signal.

At the output of the fiber, the beam 4, after demodulation detection, gives a microwave signal 9.

The two microwave signals 9 and 19 given are amplified and then injected into an amplitude-phase demodulator giving a signal (a voltage) proportional to the phase-shift of the two signals 9 and 19.

Figure 2:
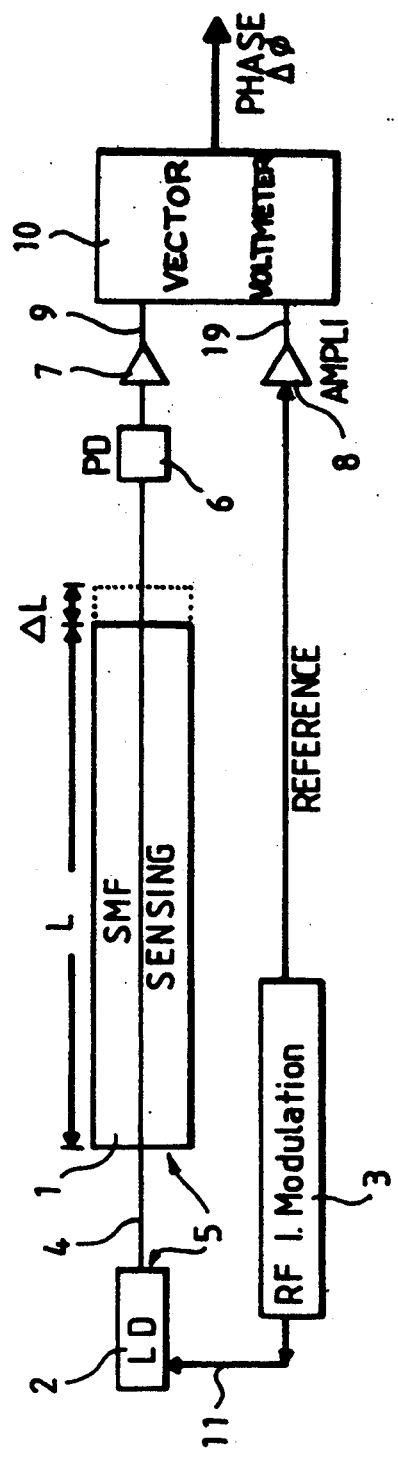
FIG. 2 shows a detailed view of an exemplary embodiment of the device of the invention.

Referring to FIG. 2, we shall now give a detailed description of an exemplary embodiment of the device of the invention.

A laser device 2 is modulated in amplitude by a RF signal 11, the frequency of which will be chosen as a function of the desired spatial resolution and of the phase precision that can be achieved by the microwave measurements.

This microwave signal 11 on an optical carier 4 is injected into the optical fiber 1 playing the role of an intrinsic sensor.

The application of a stress such as, for example, an elongation stress or a compression stress on the optical fiber creates a variation in the refraction index of the medium, expressed by a phase-shift of the measurement signal 9 with respect to the reference signal 19.

At the output of the fiber, the measurement signal will be demodulated by a detector 6 having a passband compatible with the frequency of modulation of the source laser diode 2. The demodulated signal and the modulation reference signal are amplified by the amplifiers 7 and 8.

The comparison of the reference signal 19 and the measurement signal 9 by the device 10 gives a measurement of phase shift that is proportional to the elongation and to the compression of the measurement optical fiber.

This phase-shift is of the following type:

$$\Delta\Phi = \frac{2\pi}{\lambda} \Delta(n \cdot L)$$
$$= \frac{2\pi}{\lambda} (\Delta n \cdot L + n\Delta L)$$

where:
n=index of the fiber
L=length of the fiber

Figure 3:
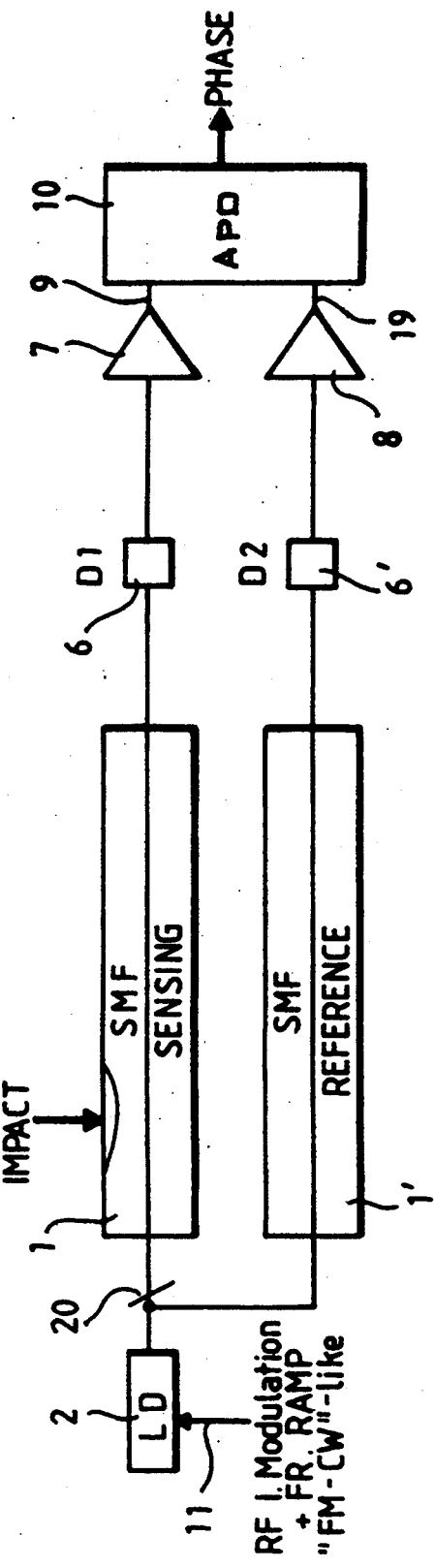
FIG. 3 shows an alternative embodiment of the device of FIG. 2.

The device of FIG. 3 is a variant of the device of FIG. 2. It is used here for example to detect a localized stress such as an impact (a shock for example).

This device has a measurement fiber 1 and a reference fiber 1' not subjected to stresses. The source 2 gives a light beam modulated as above to a beam separator 20 which divides the beam into two parts towards the fibers 1 and 1'.

Detectors 6 and 6' demodulate the beams transmitted by the fibers. The signals demodulated and then amplified by the amplifiers 7 and 8 are transmitted to a phase-shift measuring device 10.

If the measurement fiber 1 is subjected to a stress, said stress is detected by the measurement of phase-shift.

Figure 4:
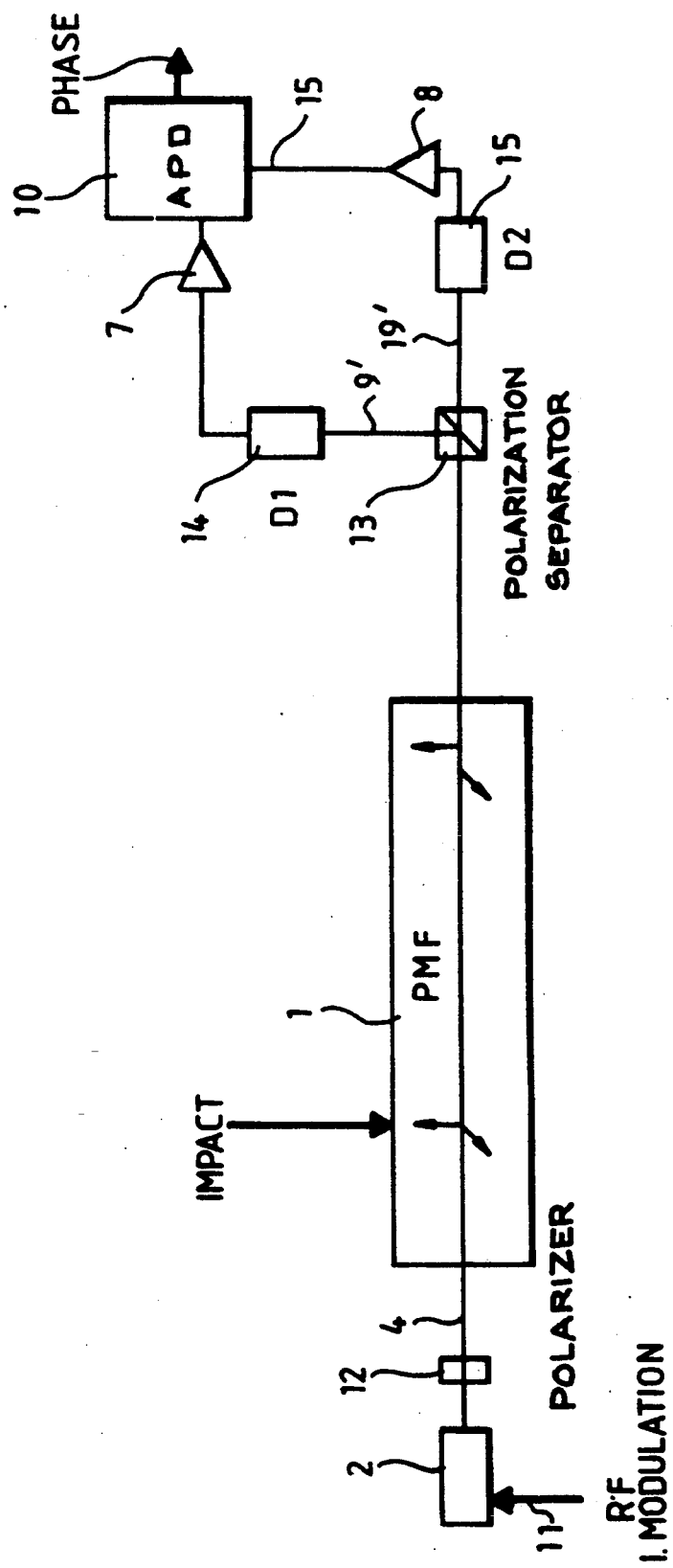
FIG. 4 shows an exemplary embodiment of the invention, in which the fiber is a polarization maintaining fiber.

The method of measurement carried out by the device of FIG. 4 is based on the measurement of the phase-shift (or of the delay) between two microwave signals transmitted on one and the same optical channel.

The device of FIG. 4 comprises chiefly a polarization-maintaining optical fiber 1 receiving a light beam 4 polarized by a polarizer 12.

The laser diode 2 is modulated in amplitude by an alternating signal 11 (for example an RF signal), the frequency of which will be chosen as a function of the desired spatial resolution and of the phase precision that can be achieved by microwave measurements.

The alternating signal 11 on an optical carrier is injected into the polarization-maintaining optical fiber 1 playing the role of an intrinsic sensor (a fiber with hollowed structure for example). This fiber has two orthogonal propagation modes (a slow axis and a fast axis).

The stresses caused by a defect, a shock or an impact on the structure to be checked induce a local pinching of the optical fiber. This stress on the fiber results in a coupling point, i.e. a transfer of energy from one polarization mode to the other.

One of the polarization modes will serve as a reference channel (the fast axis, for example), and a coupling point will induce a transfer of energy to the second mode (the slow axis). The two signals will arrive with a delay that is proportional to the difference in speed of propagation between the slow axis and the fast axis and is proportional to the length of the fiber that is travelled through after the coupling point.

At output of the fiber, after passing into a polarization separator 13, the two signals 9' and 19' are demodulated by the detectors 14 and 15, having a passband compatible with the frequency of modulation of the source laser diode 2.

The two microwave signals given by the two detectors 14 and 15 are amplified (by amplifiers 7 and 8) and then injected into an amplitude-phase modulator 10 giving a signal (a voltage) proportional to the phase-shift of the two channels.

The value of the phase-shift measured by the device 10 expresses the distance between the point of impact of the disturbance and the output of the fiber 1. This phase-shift therefore makes it possible to localize the position of the point of impact on the fiber.

The intensity of the signal resulting from the transfer of energy at the point of impact (coupling point) gives an indication on the intensity of the coupling, hence on the intensity of the impact. A device 15 to measure the intensity of the signal resulting from the transfer of energy indicates the value of the impact.

According to an alternative embodiment, the modulation frequency signal 11 comprises a sequence of successive modulation frequencies. According to a preferred embodiment, these frequencies take the form of alternations of different frequencies which are either variable continuously or variable in successive steps. In this way, several impacts can be detected simultaneously on the fiber 1 by identification of the frequency having given rise to a transfer of energy.

The different devices described here above work with a single passage of the light beam 4 into the fiber 1. According to one variant (see FIG. 5), there is provision, at the output of the fiber 1, for a reflection device 16 such that the light, after it has travelled through the fiber 1, is reflected and travels through the fiber in the reverse direction. A semi-reflecting device 17 reflects at least a part of the light coming from the fiber towards the detection devices and notably towards the phase-shift measuring device 10. An arrangement such as this, applied notably to the device of FIG. 2, makes it possible to double the effect of delay of the stress applied to the fiber and to make it easier to detect this stress.

Figure 5:
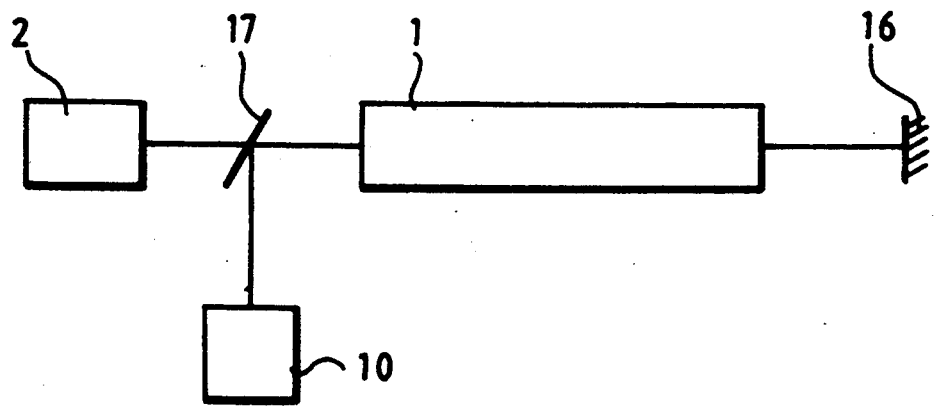
FIGS. 5 and 6 show alternative embodiments of the device of the invention.

In FIG. 5, the device 17 is a semi-reflecting device but it could be a coupling device made by integrated optics technology enabling the light coming from the fiber to be transmitted to the device 10.

Figure 6:
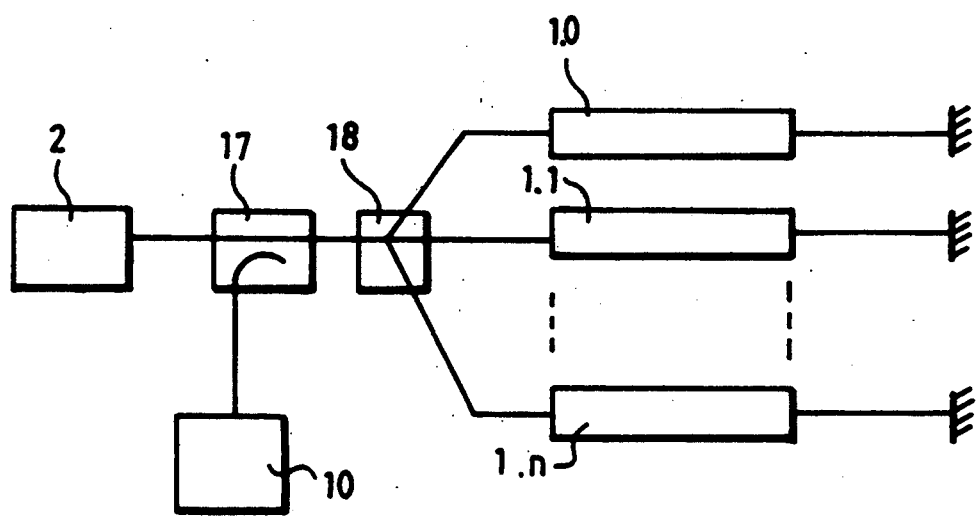

FIG. 6 shows a variant of the device of the invention, according to which the optical source 2 transmits a modulated beam which is distributed among several measurements fibers 1.0 to 1.n by a beam separator 18. Depending on the application of the variant of FIG. 4, reflection devices send back the light transmitted by the different fibers towards a coupler 17 which retransmits the reflected light towards the measurement device 10.

The device of FIG. 6 therefore enables the integration of the effects of several stresses that simultaneously affect several measurement fibers.

These exemplary embodiments of the invention thus enable the conversion of measurements of interference in terms of wavelengths into measurements of interference in terms of microwaves. These devices consequently make it possible to do away with the use of a Michelson interferometer. It is no longer necessary to measure optical delays. Rather, it phase-shifts in terms of microwaves that are measured.

This means a simplification of the reading system as regards systems using integrated microwave electronic circuits.

Furthermore, the integrated electronic circuitry which may be used in the reading system permits in-flight use of the damage checking system. This may be an important factor for airborne applications.

Furthermore, this system provides real-time information on the structure being checked.

There are two major types of applications of the invention.

Measurements of elongation or compression

In the case of a measurement of elongation or compression, the devices described do not call for any specific fibers but can work with standard monomode fibers.

For applications to the checking of damage to structures, this measurement will find application an structures subjected to stresses, strains or shocks, for example constructive works such as bridges, tunnels etc, airborne structures or storage tanks. These measures can be extended to the case of cracks in buildings.

Measurements of stresses, strains or shocks

These measurements require the following element owing to its sensitivity with respect to the above-mentioned measurement parameters: a polarization-maintaining fiber, for example a fiber of the hollowed structure type for the measurements of stresses, strains or shocks.

The applications to the checking of damage to structures will be:

Measurements of stresses in concrete structures;

Measurements of thermo-mechanical strains. This measurement calls for the making of a two-fiber sensor, one sensitive to temperature and the other sensitive to mechanical stresses;

Measurements of sensitivity to shocks or to impacts by the making of an impact sensor attached to a structure irrespectively of its shape (the sensor may be a smart flexible ribbon).

It is clear that the above description has been given purely by way of an example and that other variants may be envisaged.

What is claimed is:

1. A stress detector, comprising:
 an optical radiation source for generating optical radiation, said optical radiation source having an amplitude modulation control input;
 an optical fiber having a first end and a second end, said first end being coupled to said optical radiation source to receive optical radiation from said optical radiation source;
 an optical detector having an optical detector input and an optical detector output, said optical detector input being coupled to said second end of said optical fiber for detecting optical radiation from said second end and for providing a signal corresponding to the detected optical radiation to said optical detector output;

means for generating an amplitude modulation signal having an amplitude modulation signal output providing said amplitude modulation signal, said amplitude modulation signal output being coupled to said amplitude modulation control input of said optical radiation source, wherein said amplitude modulation signal controls amplitude modulation of said optical radiation to thereby amplitude modulate said optical radiation;

a phase comparator having first and second phase comparison signal inputs for comparing a phase difference between signals received by said first and second phase comparison signal inputs and for generating a phase difference output signal corresponding to said phase difference, wherein said optical detector output is coupled to the first phase comparison signal input of the phase comparator and the amplitude modulation signal output of said means for generating is coupled to the second phase comparison signal input; and wherein said phase difference output signal is output by the phase comparator.

2. A device according to claim 1, wherein the optical radiation source is a laser.

3. A detector according to claim 1, wherein said amplitude modulation signal is and RF or microwave signal.

4. A detector according to claim 1, wherein said optical fiber is a monomode optical fiber.

5. A detector according to claim 1, wherein said optical fiber is a sensor optical fiber and said optical detector is a sensor optical detector; and wherein said amplitude modulation signal is coupled to the second phase comparison signal input via a beam separator that is coupled to the sensor optical fiber, a reference optical fiber that is coupled to the beam separator, and a reference optical detector that is coupled to the reference optical fiber and to the second phase comparison signal input.

6. A detector according to claim 1, wherein said optical fiber is a polarization maintaining optical fiber;

further comprising first and second polarizers located at the first and second ends, respectively, of said optical fiber.

7. A stress detector, comprising:

an optical radiation source for generating optical radiation, said optical radiation source having an amplitude modulation control input;

a first optical fiber having a first end and a second end, said first end being coupled to said optical radiation source to receive optical radiation from said optical radiation source;

a first reflector coupled to said second end of said first optical fiber for reflecting said optical radiation towards said first end of said first optical fiber;

a beam separator coupled to said first end of said first optical fiber for transmitting part of said optical radiation out of said first optical fiber;

an optical detector having an optical detector input and an optical detector output, said optical detector input receiving said part of said optical radiation providing a signal corresponding to the detected optical radiation at said optical detector output;

means for generating an amplitude modulation signal having an amplitude modulation signal output providing said amplitude modulation signal, said amplitude modulation signal output being coupled to said amplitude modulation control input of said optical radiation source, wherein said amplitude modulation signal controls amplitude modulation of said optical radiation to thereby amplitude modulate said optical radiation;

a phase comparator having first and second phase comparison signal inputs for comparing a phase difference between signals received by said first and second phase comparison signal inputs and for generating a phase difference output signal corresponding to said phase difference, wherein said optical detector output is coupled to the first phase comparison signal input of the phase comparator and the amplitude modulation signal is coupled to the second phase comparison signal input; and wherein said phase difference output signal is output by the phase comparator.

8. A detector according to claim 7, further comprising a;

a plurality of optical fibers, each which has an end that is coupled to the optical radiation source and a reflector end; and a plurality of reflectors, each of which is coupled to one of the reflector ends.

9. A detector according to claim 7, wherein said amplitude modulation signal is an RF or microwave signal.

* * * * *